United States Patent
Hegi

(10) Patent No.: US 9,422,738 B2
(45) Date of Patent: Aug. 23, 2016

(54) FILTER APPARATUS WITH FILTER CLEANING ARRANGEMENT

(71) Applicant: Ulrich Hegi, Fort Myers, FL (US)

(72) Inventor: Ulrich Hegi, Fort Myers, FL (US)

(*) Notice: Subject to any disclaimer, the term of this patent is extended or adjusted under 35 U.S.C. 154(b) by 124 days.

(21) Appl. No.: 14/450,269

(22) Filed: Aug. 3, 2014

(65) Prior Publication Data

US 2016/0032603 A1   Feb. 4, 2016

(51) Int. Cl.
*E04H 4/16*   (2006.01)

(52) U.S. Cl.
CPC ..................... *E04H 4/16* (2013.01)

(58) Field of Classification Search
CPC ........................................ E04H 4/16
USPC ............ 210/167.12, 167.14, 391, 393, 416.1, 210/416.2
See application file for complete search history.

(56) References Cited

U.S. PATENT DOCUMENTS

| | | | | | |
|---|---|---|---|---|---|
| 3,236,249 | A | * | 2/1966 | Everroad | B01D 27/04 134/167 R |
| 3,297,163 | A | * | 1/1967 | Landon | B01D 29/41 210/167.14 |
| 3,363,771 | A | * | 1/1968 | Walters | B01D 33/073 209/270 |
| 4,790,942 | A | * | 12/1988 | Shmidt | B01D 9/00 210/321.63 |
| 5,074,999 | A | * | 12/1991 | Drori | B01D 29/114 210/143 |
| 5,989,419 | A | * | 11/1999 | Dudley | B01D 41/04 134/138 |
| 6,156,213 | A | * | 12/2000 | Dudley | B01D 41/04 134/138 |
| 6,666,976 | B2 | * | 12/2003 | Benenson, Jr. | B01D 29/15 210/393 |
| 6,874,641 | B2 | * | 4/2005 | Clary | B01D 29/21 134/138 |
| 2004/0149318 | A1 | * | 8/2004 | Su | B08B 9/00 134/22.18 |
| 2006/0243309 | A1 | * | 11/2006 | Prescott | B01D 41/04 134/33 |

FOREIGN PATENT DOCUMENTS

| | | | |
|---|---|---|---|
| DE | 3537138 | * | 4/1987 |
| FR | 2913348 | * | 9/2008 |
| FR | 2944454 | * | 10/2010 |

\* cited by examiner

*Primary Examiner* — Fred Prince
(74) *Attorney, Agent, or Firm* — Klaus J. Bach

(57) ABSTRACT

In a filter apparatus with a filter for filtering a liquid including, in a housing, a filter structure which is rotatably supported off-center so that it is arranged at one side in close proximity to the housing wall and at the opposite side a housing space is formed in which at least one nozzle tube with nozzle openings directed toward the filter structure and advantageously also an ultrasound transducer are arranged for removing deposits from the filter structure. A liquid inlet is connected to filter housing bottom wall in the area of the housing space and a return pipe is connected to the bottom wall in communication with a center passage of the filter structure for discharging cleaned liquid. The liquid inlet includes a valve for blocking the water flow and a drain opening for draining cleaning liquid during filter cleaning.

13 Claims, 3 Drawing Sheets

FILTER APPARATUS WITH FILTER CLEANING ARRANGEMENT

This is a continuation-in-part application of pending U.S. application Ser. No. 13/317,793 filed Oct. 28, 2011.

BACKGROUND OF THE INVENTION

The invention resides in a filter apparatus through which for example the water of a pool is circulated for the removal of impurities. Of course, the filter apparatus may also be used for cleaning other liquids.

Water pools in the form of for example swimming pools or fountain pools as present for example in shopping malls or gated communities or parks or even in front yards of residences require cleaning of the water by filters in order to prevent the water from fouling up.

Such a pool filter comprises for example a housing in which a filter cartridge or another filter structure is arranged for filtering the water of a pool. The pool water is circulated through the filter housing via an inlet pipe and leaves the filter housing through an outlet pipe arranged so that the water is conducted in the filter housing through the filter structure. The filter structure needs to be cleaned or replaced from time to time to prevent clogging thereof. For cleaning the filter structure, the housing generally needs to be opened to remove the filter structure for the cleaning or replacement.

U.S. Pat. No. 7,794,591 discloses for example a pool filter with a housing defining a fluid chamber and including four filter cartridges. The pool water is pumped from the pool into the housing and radially through the filter cartridges and flows axially out of the filter cartridges into a discharge pipe via which the cleaned water is returned to the pool. Impurities are deposited on the outer surfaces of the filter cartridges. From time to time, the housing needs to be opened for the replacement of the filter cartridges.

It is the object of the present invention to provide a filter with a filter structure disposed in a housing wherein impurities are uniformly deposited on the filter surfaces for long filtering periods and effective cleaning operation and the filter structure does not need to be removed for cleaning but filter cleaning is performed automatically in a simple and very effective manner while the filter structure remains installed in the housing.

SUMMARY OF THE INVENTION

In a filter apparatus for filtering a liquid such as the water of a swimming or fountain pool including a filter housing, a filter structure is rotatably supported off-center in the filter housing so that it is arranged at one side in close proximity with a housing wall and, at the opposite side, a housing space is formed between the filter structure and the housing wall in which at least one filter cleaning nozzle tube is arranged. The nozzle tube has nozzle openings directed toward the filter structure for washing deposits off the filter. For example, a pool water inlet is connected to a filter housing bottom wall in the area of the housing space and a return pipe is connected to the bottom wall in communication with a center passage of the filter structure so that pool water can be circulated through the filter structure while the filter structure is rotated. The inlet pipe includes a valve for blocking the water flow to the filter housing and a drain opening for draining water from the filter housing during filter cleaning operation.

Since in this pool filter, the filter structure is rotated the deposits are evenly distributed on the filter surfaces whereby an efficient and effective cleaning process can be maintained over a relatively long period. And when the deposits are beginning to restrict the flow of water through the filter structure, the filter is automatically and effectively cleaned by cleaning water jets emitted by the nozzles of a filter cleaning tube arranged in the filter housing.

Preferably, also an ultrasonic transducer is arranged in the housing space at one side of the filter which ultrasonic transducer is activated during the cleaning procedure in order to loosen the deposits on the filter surfaces. The filter therefore is operative over long periods without requiring servicing.

The invention will become more readily apparent from the following description of a particular embodiment thereof with reference to the accompanying drawings.

DESCRIPTION OF A PARTICULAR EMBODIMENT

Figures 1, 2:
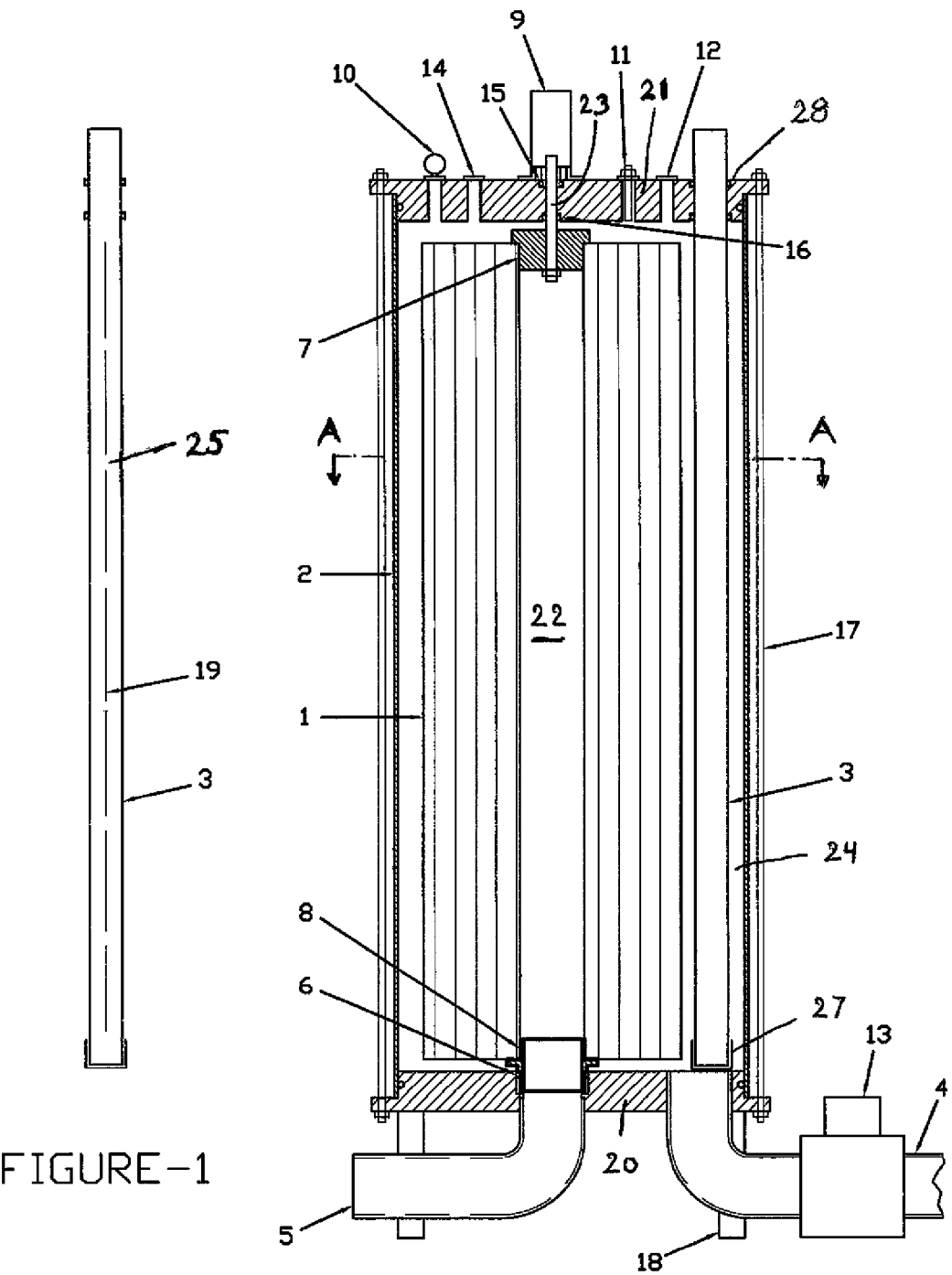
FIG. 1 shows the cleaning nozzle tube.
FIG. 2 is an axial cross-sectional view of the filter according to the invention.
Figure 3:
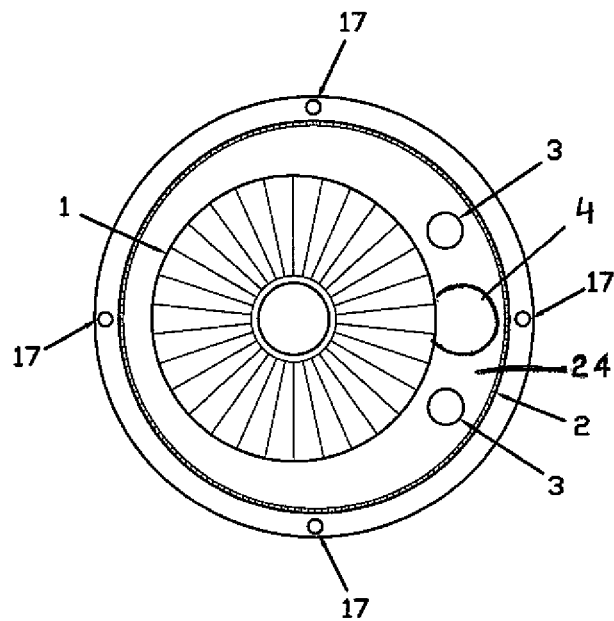
FIG. 3 is a cross-sectional view taken along line A-A of FIG. 2.

FIG. 2 shows the water filter according to the invention in an axial cross-sectional view. It comprises a housing 2 with a preferably cylindrical wall provided at opposite ends with a bottom end wall 20 and a top end wall 21 which are sealingly joined to the cylindrical housing wall for example by connecting rods 17. Within the housing 2, a filter structure 1 is rotatably supported between the opposite end walls 20, 21 of the housing 2. The filter structure 1 comprises an annular array of pleated sheets arranged around a central passage 22. The filter structure 1 is supported off-center within the housing so that, at one side, there is little space between the filter and the side wall of housing 2 as the filter is disposed closely adjacent to the wall of the housing 2 whereas a substantially larger housing space 24 is formed between the opposite wall area of the housing 2 and the filter structure 1. A pool water or other liquid inlet pipe 4 is connected to the bottom end wall 20 for supplying pool water to the larger housing space 24 of the filter housing. A discharge pipe is connected to the bottom end wall 20 in alignment with the central passage 22 of the filter structure 1 so that pool water supplied to the filter housing via the supply pipe flows from the housing space around the filter 1 through the filter structure 1 into the central filter passage 22 and from there, via the discharge pipe 5 out of the filter housing.

The passage 22 of the filter structure 1 is closed at its top by a plug 7 connected to the filter structure 1 and is rotatably supported at the bottom end wall 20 by an adapter 8 and a sealed bearing 6.

A filter structure drive with a motor 9 provided with a drive shaft 23 is disposed on the top end wall of the filter. The drive shaft 23 extends through the top end wall 21 in axial alignment with the filter structure 1 and is supported by a shaft bearing 16 disposed in the top end walls 21. The drive shaft 23 is sealed by a seal 15 and connected to the plug 7 which also forms a support member engaging the filter structure 1 for rotating the filter structure 1.

In the large housing space 24 between the filter structure 1 and the wall of the housing 2 a cleaning nozzle tube 3 is arranged adjacent the filter structure 1. The nozzle tube 3 includes cleaning liquid nozzles 19 disposed over the length of the nozzle tube 3 for directing lets onto the pleated filter walls during filter cleaning intervals. During such intervals, a cleaning liquid (generally water) under pressure is supplied to the cleaning nozzle tube 3 so as to direct cleaning liquid jets onto the filter while the filter structure 1 is rotated. Any deposits are washed away thereby and are carried out of the filter housing by way of the inlet pipe 4 which, at this point, is connected to a drain for discharging the cleaning liquid together with the deposits. A switch-over valve arrangement 13 is provided in the inlet pipe 4. For cleaning, fresh water or pool water could be used, which is conducted into the nozzle tube pipe 3 at its end extending through the top end wall 21.

Preferably, two spaced nozzle tubes 3 are provided and they are preferably pivotally supported by an adapter 27 at the bottom end wall 20 and seals 28 at the top end wall 21. Expediently both nozzle tubes 3 are pivotally supported so that the jets from the nozzles 19 of the tubes 3 can be directed in different adjustable directions onto the filter structure 1.

Figure 4:
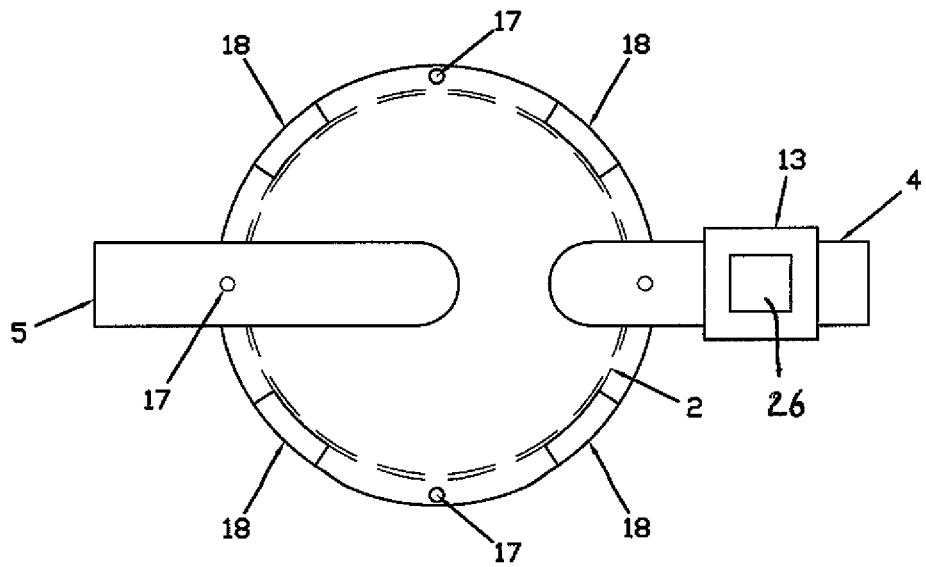
FIG. 4 is a bottom view of the filter.

As indicated in FIG. 4, the nozzle tubes 3 include slot nozzles 19, each extending over a certain length of the nozzle tubes 3. Connecting webs 25 are provided at predetermined intervals to prevent widening of the slot nozzles. Alternatively, individual nozzles may be arranged side by side in spaced relationship along the length of the pipe 3 for cleaning the whole filter structure 1 while the filter structure is rotated. The slot nozzles may have for example a width of 0.25 mm.

Rotation of the filter structure not only during cleaning but also during normal filtering operation provides for a uniform deposition of the filtered-out material thereby not only providing for a relatively long filtering operation between cleaning intervals but also for a uniform and effective cleaning of the water passing through the filter.

The filter housing 2 is supported by legs 18 provided preferably at the bottom end wall 20 of the filter. The filter adapter 8 sealed and the sealed bearing 6 rotatably supporting the filter 1 provide for a sealing connection between the central filter passage 22 and the outlet pipe 5.

On the top end wall 21 of the filter housing 2, a pressure gauge 10 is arranged for measuring the back pressure of the pool water in the filter housing 2. There is furthermore a venting opening 11 closed by a removable plug or by a valve for releasing any air or gases collected in the filter housing 2. The top end wall 21 further includes a pressure sensor 12 and a pH sensor 14 for monitoring for example pool water conditions. The inlet pipe 4 includes a switch-over valve 13 for blocking communication with the pool and controlling a drain opening 26 for releasing wash water or liquid from the filter housing 2 during filter cleaning operation.

A filter cleaning operation is initiated when the back pressure within the filter housing 2 reaches a predetermined threshold value indicating a certain filter resistance caused by a deposit layer on the filter surfaces. Then the drain 26 is opened and the inlet pipe 4 is blocked by the switch-over valve 13, which is preferably an electromagnetic valve. Wash water or liquid is then pumped into the cleaning nozzle tubes 3 whereby cleaning jets are directed onto the filter surfaces for washing off the filter deposits. The filter structure 1 is continuously rotated during the cleaning operation for example, at two rotations per minute so that all filter surfaces are subjected to the jets and the filter deposits are washed off and carried out of the filter housing 2 via the drain opening 26 of the switch-over valve 13. At the end of the cleaning interval the switch-over valve is again actuated to close the drain 26 and re-establish communication with the inlet pipe 4 so that normal filtering operation can be resumed.

As already noted, by the rotation of the filter structure impurities are uniformly deposited on the filter and, during the cleaning procedure, the deposits are uniformly removed by the cleaning jets of the nozzle tubes 3 within a predetermined period. The cleaning periods are individually adjustable depending on the respective application. After completion of the cleaning operation, first the water or cleaning liquid supply to the nozzle tubes 3 and preferably also the drive motor 9 are shut down while the cleaning liquid including the deposits is permitted to flow out of the filter via the valve 13 for example for five minutes, after which time the valve 13 is closed. Then, for example after two more minutes, the pool circulation pumps and the drive motor 9 for rotating the filter are again started so that normal filtering operation is resumed.

During operation of the filter, if specifically used in connection with a pool, the pH measuring device 14 constantly monitors the pH value of the pool water and provides for example an optical or audible signal whenever the pH value drops below or above predetermined threshold values so that appropriate measures can be taken to correct the situation without the need for taking pool water samples and analyzing them.

Figure 5:
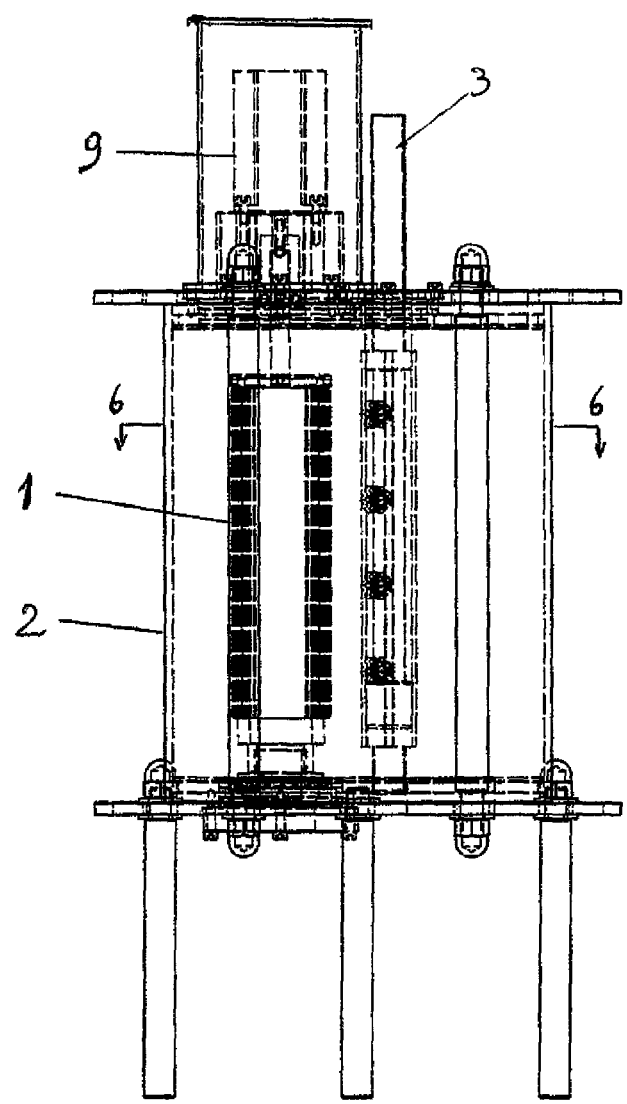
FIG. 5 shows schematically the filter with the filter cartridge disposed in the housing off center together with a nozzle tube 1 and an ultrasonic transducer and, FIG. 6 shows schematically the filter in a cross-sectional view taken along line 6-6 of FIG. 5.
Figure 6:
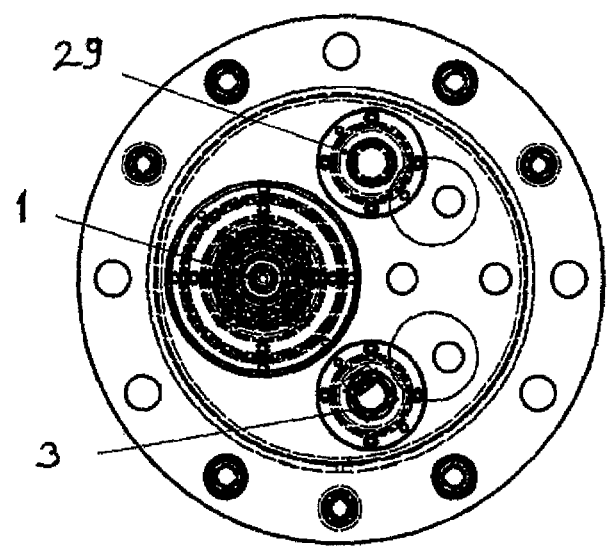

In a preferred embodiment, instead of the second nozzle tube, or in addition to the nozzle tubes 3, an ultrasound transducer 29 is arranged in the filter housing 2, that is, in the larger housing space 24. As shown schematically in FIGS. 5 and 6, the ultrasound transducer 29 is preferably tubular and extends between the top wall 21 and the bottom wall 20 of the housing space 24. The ultrasound transducer is energized during cleaning of the filter 1 in order to loosen the filter deposits from the filter surfaces. This greatly facilitates the removal of the filter deposits by the nozzle tube or tubes and also breaks up larger pieces thereby avoiding blockages in the drain 26. Preferably the ultrasound transducer 29 is arranged in the housing space 24 ahead of the cleaning nozzle tube or tubes 3 in the direction of rotation of the filter 1.

LISTING OF REFERENCE NUMERALS

| | |
|---|---|
| 1 | Filter structure |
| 2 | Filter housing |
| 3 | Cleaning nozzle tube |
| 4 | Pool water inlet pipe |
| 5 | Pool water outlet pipe |
| 6 | Lower bearing |
| 7 | Filter plug and support member |
| 8 | Filter adapter |
| 9 | Drive motor |
| 10 | Pressure sensor |
| 11 | Venting screw |
| 12 | Pressure sensor |
| 13 | Valve |
| 14 | pH measuring device |
| 15 | Seal ring |
| 16 | Upper bearing |
| 17 | Threaded rod |
| 18 | Support leg |
| 19 | nozzle slot |
| 20 | Bottom end wall |
| 21 | Top end wall |
| 22 | Central passage |
| 23 | Drive shaft |
| 24 | Housing space |
| 25 | Web between nozzle slots |
| 26 | Drain opening |
| 27 | Nozzle tube adapter |

| 28 | Seals |
| 29 | Ultrasound transducer |

What is claimed is:

1. A filter apparatus for filtering contaminated liquids, comprising:
   a cylindrical filter housing (2) including side walls and bottom and top end walls (20, 21) attached to the side walls so as to close the filter housing (2),
   an annular filter structure (1) with a central passage (22) rotatably supported by the bottom and top end walls (20, 21) in an off-center position so that the filter is arranged at one side closer to the side wall of the housing (2) relative to an opposite side wall of the housing (2) so that from the area at the one side of the filter a space between the filter structure (1) and the wall of the cylindrical housing (2) widens continuously to the opposite side, whereby, at the opposite side, the filter structure (1) is arranged spaced from the side wall so as to form adjacent the filter structure (1) a housing space (24) extending over the length of the filter structure (1),
   two cleaning nozzle tubes (3) with nozzles (19) arranged in the housing space (24) in spaced relationship so as to extend along the filter structure (1) and having nozzle openings for directing a wash liquid toward the filter structure (1) for washing deposits off the filter structure (1) during cleaning operation of the filter structure (1), the cleaning nozzle tubes (3) being pivotally supported so as to permit adjustment of the direction of the orientation of the nozzles (19) toward the filter structure (1),
   a drive device (9) disposed on the top end wall (21) with a drive shaft (23) extending through the top end wall (21) for rotating the filter structure (1),
   a supply pipe (4) connected to the bottom end wall (20) of the filter housing in the area of the housing space (24) for conducting the contaminated liquid to the housing space and around the filter structure (1) and directing it through the filter structure (1) into the central passage (22) of the filter structure (1),
   a return pipe (5) connected to the bottom end wall (20) of the filter housing in axial alignment with the central passage (22) of the filter structure (1) for receiving the filtered liquid and conducting it out of the filter housing, and
   a valve device (13) arranged in the supply pipe (4) for blocking the flow of the contaminated liquid to the filter structure (1) and having a drain opening (26) for draining the wash liquid from the filter structure (1) during the cleaning operation.

2. The filter apparatus according to claim 1, wherein the filter structure (1) comprises pleated filter sheets arranged in an annular array defining within the central passage (22).

3. The filter apparatus according to claim 1, wherein a drive device (9) is disposed on the top end wall (2) and has a drive shaft (23) extending through the top end wall (21) for rotating the filter structure (1).

4. The filter apparatus according to claim 1, wherein the central passage (22) of the filter structure (1) is plugged at the top by a plug member (7) firmly connected to the filter structure (1) and the drive shaft (23) extends through the plug member (7).

5. The filter apparatus according to claim 1, wherein the nozzle tube (3) is provided with slot-nozzles (19) extending axially along the nozzle tube (3) interrupted only by connecting webs (25) arranged at predetermined intervals for maintaining a predetermined slot gap.

6. The filter apparatus according to claim 5, wherein the slot nozzles (19) have a gap width of about 0.25 mm.

7. A filter apparatus with a filter cleaning arrangement for filtering contaminated liquids, comprising:
   a cylindrical filter housing (2) including side walls and bottom and top end walls (20, 21) attached to the side walls so as to close the filter housing (2),
   an annular filter structure (1) with a central passage (22) rotatably supported by the bottom and top end walls (20, 21) in an off-center position so that the filter is arranged at one side closer to a side wall of the housing (2) relative to an opposite side wall of the housing so that at the opposite side a housing space (24) is formed,
   at least one cleaning nozzle tube (3) arranged within the housing space (24) so as to extend along the filter structure (1) and having nozzle openings directed toward the filter structure (1) so as to form cleaning jets for washing deposits off the filter structure (1) during cleaning operation of the filter structure (1),
   an ultrasound transducer (29) also arranged in the housing space (24) to be energized during filter cleaning for loosening filter deposits in order to facilitate their removal by the cleaning jets,
   a drive device (9) disposed on the top end wall (21) with a drive shaft (23) extending through the top end wall (21) for rotating the filter structure (1),
   a supply pipe (4) connected to the bottom end wall (20) of the filter housing in the area of the housing space (24) for conducting the contaminated liquids to the housing space and around the filter structure (1) and directing the liquids through the filter structure (1) into the central passage (22) of the filter structure (1), and
   a discharge pipe (5) connected to the bottom end wall (20) of the filter housing in axial alignment with the central passage (22) of the filter structure (1) for conducting the filtered liquids out of the filter housing (2).

8. The filter apparatus according to claim 7, wherein a valve device (13) is arranged in the supply pipe (4) for blocking the flow of the contaminated liquids to the filter structure (1) and having a drain opening (26) for draining washing liquid from the filter structure (1) during cleaning operation.

9. The filter apparatus according to claim 7, wherein the filter structure (1) comprises pleated filter sheets arranged in an annular array defining the central passage (22).

10. The filter apparatus according to claim 7, wherein a drive device (9) is disposed on the top end wall (2) and has a drive shaft (23) extending through the top end wall (21) for rotating the filter structure (1).

11. The filter apparatus according to claim 7, wherein two nozzle tubes (3) are arranged in the housing space (2) adjacent the filter in circumferentially spaced relationship.

12. The filter apparatus according to claim 7, wherein each cleaning nozzle tube (3) is pivotally supported so as to permit adjustment of the direction of the orientation of the nozzles (19) toward the filter structure (1).

13. The filter apparatus according to claim 7, wherein the ultrasound transducer (29) is arranged in the housing space (24) ahead of the cleaning nozzle tube or tubes 3 in the direction of rotation of the filter (1).

* * * * *